(12) United States Patent
Taylor et al.

(10) Patent No.: US 12,477,399 B2
(45) Date of Patent: Nov. 18, 2025

(54) METHOD AND APPARATUS FOR EDGELESS ENTERPRISES

(71) Applicant: Celona, Inc., Cupertino, CA (US)

(72) Inventors: John Taylor, Cupertino, CA (US); Srinivasan Balasubramanian, San Diego, CA (US); Mehmet Yavuz, Campbell, CA (US); Puneet Prabhakar Shetty, San Francisco, CA (US); Suparna Kumar, Cupertino, CA (US); Ravi Mulam, Cupertino, CA (US)

(73) Assignee: CELONA, INC., Campbell, CA (US)

( * ) Notice: Subject to any disclaimer, the term of this patent is extended or adjusted under 35 U.S.C. 154(b) by 390 days.

(21) Appl. No.: 17/976,680

(22) Filed: Oct. 28, 2022

(65) Prior Publication Data
US 2023/0134430 A1  May 4, 2023

Related U.S. Application Data

(60) Provisional application No. 63/273,788, filed on Oct. 29, 2021.

(51) Int. Cl.
| | | |
|---|---|---|
| *H04W 28/08* | (2023.01) | |
| *H04W 28/02* | (2009.01) | |
| *H04W 28/24* | (2009.01) | |

(52) U.S. Cl.
CPC ... *H04W 28/0967* (2020.05); *H04W 28/0268* (2013.01); *H04W 28/24* (2013.01)

(58) Field of Classification Search
CPC ............. H04W 28/24; H04W 28/0967; H04W 28/0268
See application file for complete search history.

(56) References Cited

U.S. PATENT DOCUMENTS

| | | | |
|---|---|---|---|
| 9,065,739 B2* | 6/2015 | Cheng | H04W 8/04 |
| 11,546,269 B2* | 1/2023 | Liu | H04L 47/215 |
| 2018/0152958 A1* | 5/2018 | Arnold | H04L 41/5009 |
| 2020/0228990 A1* | 7/2020 | Xu | H04L 41/5054 |
| 2021/0084523 A1* | 3/2021 | Kucera | H04W 28/0268 |
| 2021/0204164 A1 | 7/2021 | Yavuz et al. | |
| 2022/0255798 A1 | 8/2022 | Yavuz et al. | |
| 2023/0422082 A1* | 12/2023 | Wei | H04L 47/20 |

OTHER PUBLICATIONS

Rodriguez, Kari, International Search Report and Written Opinion received from the USPTO dated Feb. 1, 2023 for appln. No. PCT/US2022/048285, 6 pgs.

* cited by examiner

*Primary Examiner* — Mehmood B. Khan
(74) *Attorney, Agent, or Firm* — Jaquez Land Greenhaus & McFarland, LLP; Bruce W. Greenhaus

(57) ABSTRACT

A method and apparatus for allocating network resources, including computational nodes available for hosting network functions, such as 4G EPC (Evolved Packet Core) functions and/or 5GC (fifth generation Core) functions. An orchestrator monitors various network operational parameters in order to determine the most efficient allocation of resources (i.e., to determine which computational resources to allocate to hosting which network functions) at each particular point in time based on the network load and resources available.

12 Claims, 6 Drawing Sheets

METHOD AND APPARATUS FOR EDGELESS ENTERPRISES

CLAIM OF PRIORITY TO PREVIOUSLY FILED PROVISIONAL APPLICATION—INCORPORATION BY REFERENCE

This non-provisional application claims priority to an earlier-filed provisional application No. 63/273,788 filed Oct. 29, 2021, entitled "Method and Apparatus for Edgeless Enterprises" and the provisional application No. 63/273,788 filed Oct. 29, 2021, and all its contents, are hereby incorporated by reference herein as if set forth in full.

BACKGROUND

(1) Technical Field

The disclosed method and apparatus relate generally to networked communication systems. In particular, the disclosed method and apparatus relates to a method and apparatus for controlling from which of several potential locations to select to provide resources within a communication network are allocated to a particular user.

(2) Background

The use of enterprise networks that allow selected member devices to communicate with other member devices and to gain access to enterprise network resources is becoming more common with the dissemination of industry specifications by the 3GPP ($3^{rd}$ Generation Partnership Project) for $5^{th}$ generation communication networking. An enterprise network is typically established by an organization that has a need or desire to allow members of the organization to have devices that can communicate securely with one another and that can access enterprise network resources, such as servers that host applications that provide services that the members can use.

FIG. 1 is an illustration of one example of an enterprise network 100 having several campuses 102. Member UEs (User Equipment devices) 104 in each of the campuses are connected through a BS/AP (Base Station/Access Point) 105 to gain access to the enterprise network 100. Member UEs 104 can communicate with one another and with servers 106 that provide services to enterprise network members 108. A member UE 104 typically communicates wirelessly with a BS/AP 105. The BS/AP 105 is connected to a network core, such as a $4^{th}$ generation EPC (Evolved Packet Core) 110. The EPC 110 provides access to several resources, such as servers 106 within the enterprise network 100. In the example shown, a health care provider operates several local hospitals, each on a different campus 102 (i.e., physical site). Employees 108 of the health care provider, such as doctors, nurses and other health care providers, may gain access to patient records through devices 104 that they can each operate and that can connect to a server 106 located within the network 100. In some such cases, the patient records may be available from several servers 106 that are distributed throughout the enterprise network 100. By distributing the components that provide the service to the members 108 of the enterprise network, loading of the components of the enterprise network 100 can be balanced. For example, having several servers 106 distributed throughout the network 100, the load on each of the servers 106 can be balanced against the load imposed on the other such servers 106.

In addition, it may be possible to access resources outside the enterprise network 100 that can be useful in providing patient information relevant to the services that the health care provider 108 provides to their patients. For example, it may be possible to access the results of tests that were performed outside the enterprise by an independent health care service provider. In some embodiments, an enterprise $4^{th}$ generation EPC 110 is located on premises within one of the campuses 102a. The enterprise EPC 110 may be connected to an external server through the internet or through a Mobile Network Operator's network core 112.

Managing the connections between particular nodes of the enterprise network can be a difficult task. There is currently a need for a system that provides a way for the network administrator to control such connections to ensure that the network operates as efficiently as possible.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

Figure 1:
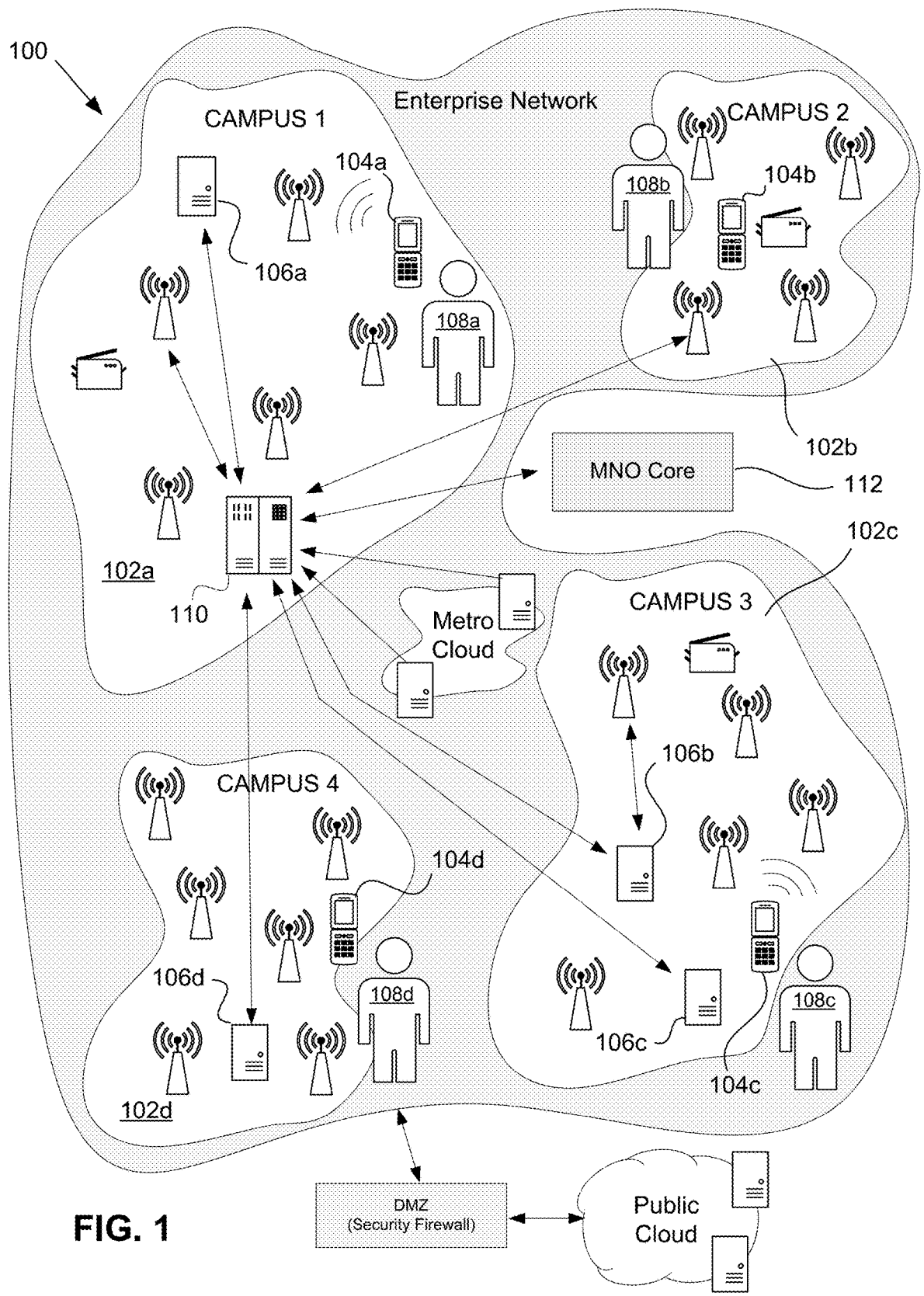
FIG. 1 is an illustration of one example of an enterprise network having several campuses.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The currently disclosed method and apparatus allows for efficient control of network communication and allocation of nodes of an enterprise network and various resources that allow services to be made available to members of the enterprise. With SBAs (Service-Based Architectures), specific groups of software functions can be combined to form a service. The term "function" in the context of this disclosure refers to steps, processes and tasks that are implemented by a programable computer in order to accomplish a larger and more complex task. These "steps, processes and tasks" may include, but are not limited to: (1) accessing data from memory; (2) performing mathematical operations on data; (3) receiving and/or transmitting data to other software functions performed either within the same hardware or different hardware; (4) performing logic operations, etc. Some software functions may be performed with the assistance of dedicated hardware or firmware that is designed to efficiently perform a specialized task. Throughout this disclosure, the term "computational node" is used to refer to hardware that can implement one or more software functions. A computational node is the hardware, such as a programmable computer, that runs programs in order to perform the tasks required to implement a function or set of functions.

The software functions that can be combined to form a service include, for example: (1) functions associated with RAN; (2) core network functions (e.g., 4G EPC (Evolved Packet Core) and 5GC ($5^{th}$ Generation Core)); and (3) orchestration layers. These functions include those that support both control and user plane aspects of the network functionality. Based on the deployment model (i.e., the architecture, configuration, physical locations type of hardware in use, etc.) of the network, functions performed by the RAN, core and orchestration components of the enterprise network can be deployed on-premise, in a metro cloud located off campus (but near the premises where other enterprise network equipment, such as RAN, etc. is located), or in a public cloud. The functionality can be grouped in various ways. For example, those functions that reside on-premise may include core functions that are run on hardware that is collocated with hardware used to perform RAN functions. In some such cases, the same processor may perform both core functions and RAN functions. Alternatively, an independent computational node within the enterprise network campus can be used for performing the RAN functionality and those core functions that reside on-premise.

Due to differences in the physical distances between the computational nodes that implement the functional components in each of these various deployment possibilities, latency metrics for services provided by a network may vary. In some cases, limitations may be imposed on the latency that can be tolerated, due to SLAs (service level agreements) that dictate the terms of the service to be provided. Accordingly, the maximum distance between a resource and an enterprise network using that resource to provide a service may be constrained. More generally, the distance between various resources required to allow an enterprise network to provide a particular service may be constrained. In addition, (1) limits on compute costs (i.e., the cost of taking advantage of particular computational resources within the network) and hardware imposed by individual nodes (i.e., the particular complexity and capability of the hardware that is available to network users), (2) security constraints, etc., can also dictate the manner in which services are provided over the enterprise network, as well as the allocation of resources that can be accessed when providing such services.

While modern 4G and 5G networks are flexible in the way that resources are allocated, once initially established, the manner in which resources used to provide services are allocated tends to remain unchanged. Therefore, configurations that the enterprise network can support are typically rigid, and so may limit how resources are provided to various users and for various types of services.

Figure 2:
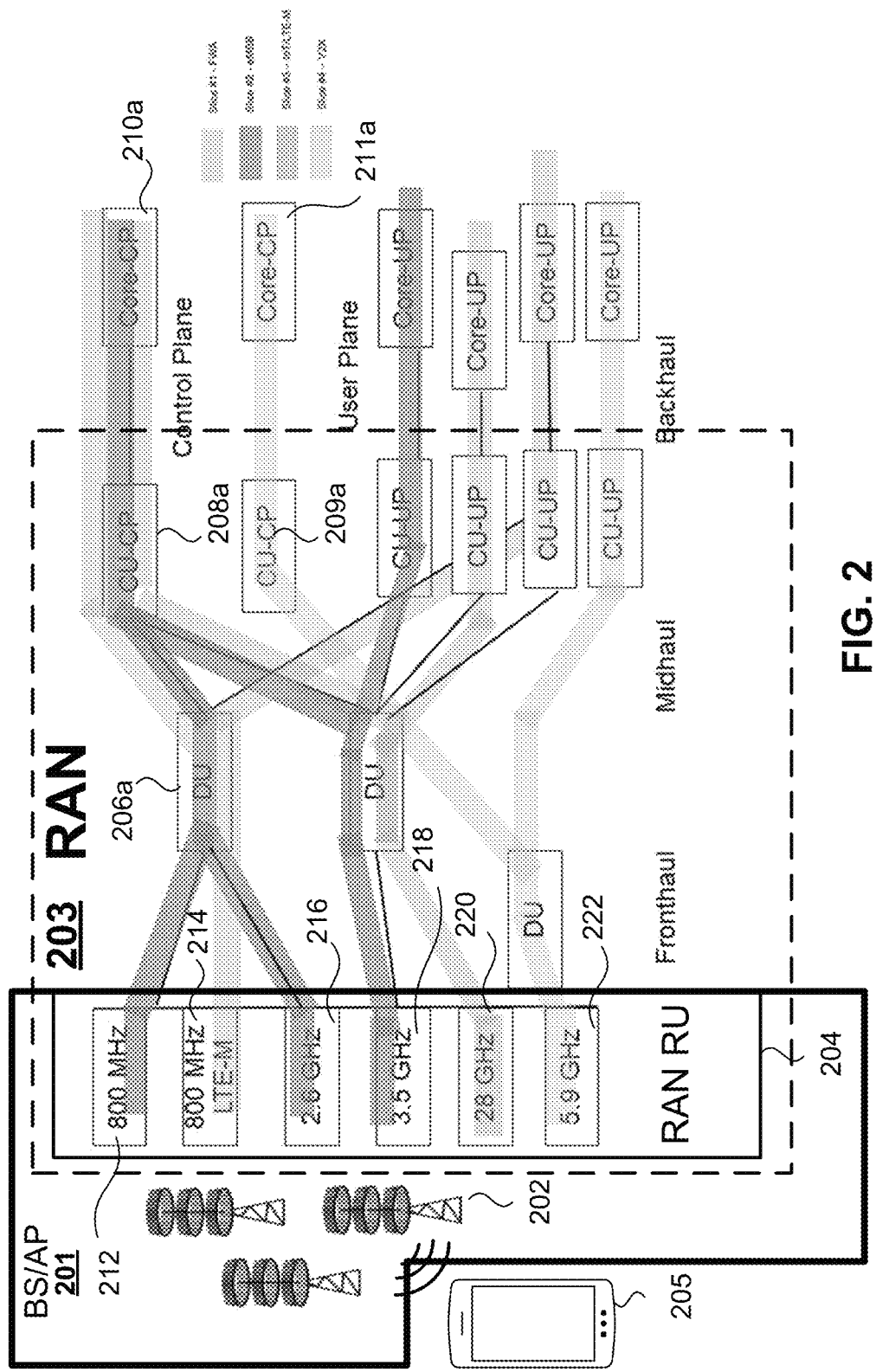
FIG. 2 shows an example of the signal flow through a RAN (Radio Access Network).

FIG. 2 shows an example of the signal flow through a RAN (Radio Access Network) 203. Initially, a UE 205 gains access to an enterprise network through a BS/AP (Base Station/Access Point) 201. A typical enterprise network will have several such BS/APs 201. However, only one such BS/AP is shown in FIG. 2.

Each BS/AP 201 has one or more antennas 202. Three antennas 202 are shown, however it will be understood that any number of such antennas 202 may be present in a BS/AP 201. In the example shown, the antennas 202 received six different received RF (radio frequency) signals at various RF frequencies. In some embodiments, a RAN 203 comprises three types of modules. The first type are RAN RUs (Remote Units) 204. The second type are RAN DUs (Distributed Units) 206. The third type are RAN CUs (Central Units) 208. In some embodiments, the RAN RUs 204, RAN DUs 206, and RAN CUs 208 of the RAN 203 reside in various locations throughout the network.

The RAN RU 204 typically reside within the BS/AP 201 in close physical proximity to the RF antennas 202. The RAN RU 204 is typically responsible for performing the layer 1 (i.e., PHY layer) functions. That is, the RAN RU 204 will receive the wireless radio signal from the UE 205 and convert the RF signals into digital signals. Accordingly, the RAN RU 204 includes the receiver amplifier, filters and analog to digital converters, demodulators, etc. It should be noted that by some definitions, the RAN 203 may also be said to include the antennas. However, for the present disclosure, the antennas are considered to be part of the BS/AP 201, but not part of the RAN 203. For the sake of simplicity, many of the details of the RAN RU 204 are not shown.

The received RF signals are provided to six different radio receivers 212, 214, 216, 218, 220, 222 within the RAN RU 204. All of the RF signals shown may have been transmitted by one UE 205. Alternatively, one or more of the RF signals shown may have been transmitted from different UEs 205. It can be seen that each received signal can be routed to any of the RAN DUs 206. In the example shown, at one particular point in time, the signal received in the RAN RU 204 through the receiver 212 is routed to the RAN DU 206a. The signal that was received in radio 216 is also routed to the RAN DU 206a. In some embodiments, the RAN DUs 206 perform layer 2 functions, such as MAC (Media Access Control) layer functions.

These signal paths are then routed from the RAN DU 206a to the RAN CU 208a. In some embodiments, the RAN CU 208 is divided into RAN CU-CP (Central Unit-Control Plane) modules and a RAN CU-UP (Central Unit-User Plane) modules. In some embodiments, the RAN CUs 208 perform additional layer 2 functions, such as the RLC (Radio Link Control) functions. From the RAN CU-CP modules 208, the signals are routed to the control plane portion of the enterprise core 210. Likewise, RAN CU-UP modules 209 route the signals to the user plane portion of the enterprise core 211.

Figure 3:
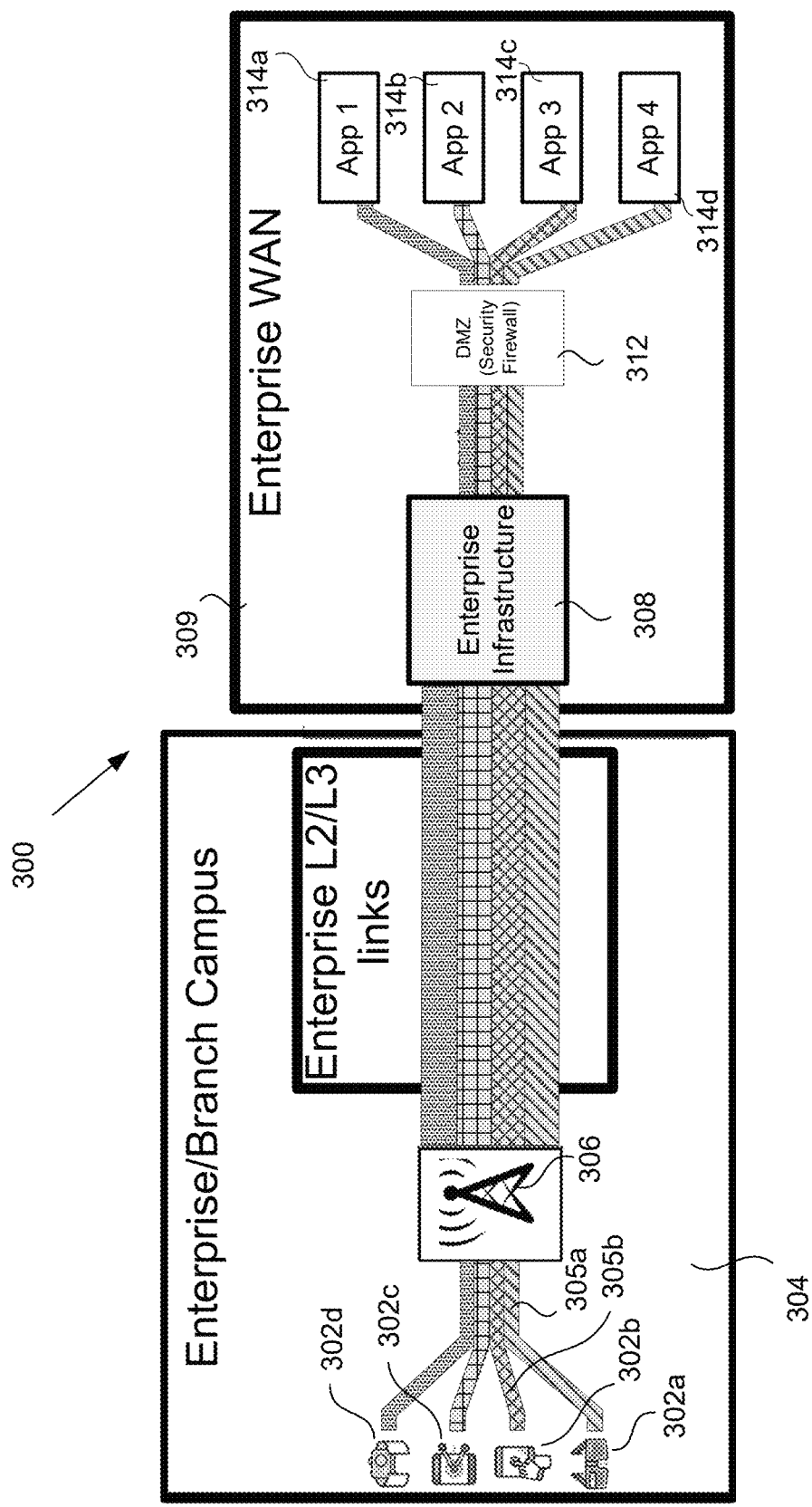
FIG. 3 is an illustration of one architecture in which member UEs are located within an enterprise campus.

FIG. 3 is an illustration of one architecture in which member UEs 302 are located within an enterprise campus 304. Examples of the types of UEs 302 that may attempt to gain access to enterprise resources include VR (virtual reality) googles 302a, bioinformatic security control devices 302b, smart phones 302c and computer vision devices 302d. Each of the UEs 302 communicate through a BS/AP (Base Station/Access Point) 306. The BS/AP 306 may be a WiFi AP (access point), a 4G LTE eNB (eNodeB), a 5G NR gNB (gNodeB) or any other BS/AP. In this architecture, the enterprise infrastructure 308 is located off-premises. An enterprise L2/L3 link (Layer 2/Layer 3 of the SCTP protocol) provides a path from the BS/AP 306 on the enterprise campus to additional enterprise infrastructure 308. In some such architectures, the enterprise infrastructure 308 includes an enterprise network core, such as a 4G EPC (Evolved Packet Core) or 5G Core. An enterprise WAN (Wide Area Network) 309 provides further connectivity to applications 314 to which the UEs 302 can attain access through the enterprise network 300.

An example of an application that might be accessed by a UE 302 through the enterprise network is a camera 302b monitoring a workspace within a manufacturing plant. The camera 302b might be connected to the enterprise network 300 operated for the benefit of the manufacturer that owns the plant. The enterprise network 300 might allow several UEs (user equipment devices) 302 to access resources. In addition, the UEs 302 may be able to communicate with one another and share information through the enterprise network 300. Servers (not shown in FIG. 3) accessible through the enterprise network 300 may provide data to the UEs 302. In addition, applications 314 may provide services to UEs 302. These services may include performing software functions. Accordingly, an application in this context is a computer program or suite of computer programs, that perform tasks for clients. Such applications may reside in local servers, metro servers, or in a public or private cloud server, etc. Such servers may hold software (computer executable code) that can be communicated to a computational node that is unique from the server or the server may execute the software functions (i.e., run the code) itself. In one example, an application that processes video information performs image recognition and outputs an indication that a particular event or subject has been captured in the video data. Such a video application may process video data acquired by a UE (e.g., the output of a camera 302b that is coupled to the enterprise network 300 as a UE).

Figure 4:
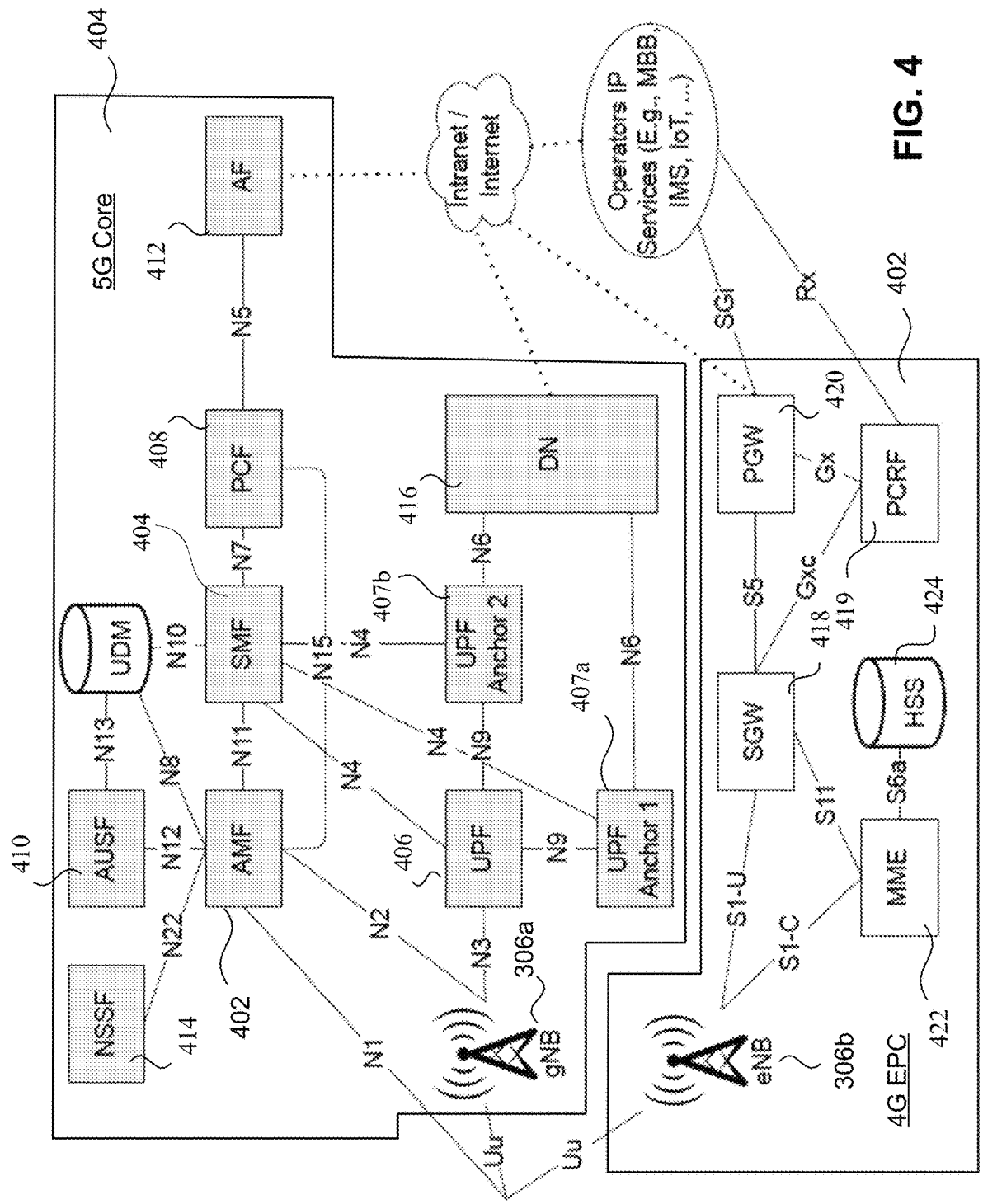
FIG. 4 is a simplified block diagram of some of the functions that are performed by the enterprise infrastructure.

FIG. 4 is a simplified block diagram of some of the functions that are performed by the enterprise infrastructure 308. The functional blocks shown are not necessarily all present in all embodiments of the presently disclosed method and apparatus. For example, lighter shaded functional blocks shown are associated with a 4G LTE network 402, while other darker shaded functional blocks are associated with a 5G NR network 404.

The following define the functions performed by the 5GC:

AMF (Access and Mobility Management Function) 402 supports the Termination of NAS signaling, NAS ciphering & integrity protection, registration management, connection management, mobility management, access authentication and authorization, and security context management.

SMF (Session Management Function) 404 supports session management (session establishment, modification, release), UE IP address allocation & management, DHCP functions, termination of NAS signaling related to session management, DL data notification, traffic steering configuration for UPF for proper traffic routing.

UPF (User plane function) 406 supports packet routing & forwarding, packet inspection, and QoS handling, and acts as an external PDU session point of interconnecting to Data Network (DN).

UPF Anchor 407 is a particular instance of the UPF functionality that serves as an anchor point for intra- & inter-RAT mobility.

PCF (Policy Control Function) 408 supports a unified policy framework, providing policy rules to CP functions, and access to subscription information for policy decisions in UDR.

AUSF (Authentication Server Function) 410 acts as an authentication server.

AF (Application Function) 412 supports application influence on traffic routing and interaction with a policy framework for policy control.

NSSF (Network Slice Selection Function) 414 supports selecting the Network Slice instances to serve the UE, determining the allowed NSSAI (Network Slice Selection Assistance Information), and determining the AMF set to be used to serve the UE.

DN (Data Networks) 416 supports access to external resources through the internet.

Likewise, the following define the functions of the EPC of a 4G network:

SGW (Serving Gateway) 418 routes and forwards user data packets through the network.

PCRF (Policy Charging and Rules Function) 419 supports monitoring and charging of use of network services by network users.

PGW (PDN Gateway) 420 is the connecting node between UEs and external networks. It is the entry point of data traffic for UEs. In order to access multiple PDNs, UEs can connect to several PGWs at the same time. Acts as the interface between the LTE network and other packet data networks; manages quality of service (QoS) and provides deep packet inspection (DPI). The functions of the PGW include:

Policy enforcement
Packet filtering
Charging support
Lawful interception
Packet screening MME (Mobility Management Entity) 422 manages session states and authenticates and tracks a user across the network.

HSS (Home Subscriber Server) 424 is the main subscriber database used within the IP Multimedia Subsystem (IMS) which provides details of the subscribers to other entities within the network.

In some embodiments, the enterprise infrastructure 308 is accessible through the enterprise WAN 309. A security firewall 312, sometimes referred to as a DMZ (De-Militarized Zone), provides a security barrier between the enterprise network 300 and applications 314 and other resources that are outside the enterprise network 300.

Each UE 302 that is granted access to resources within the enterprise network is provided a "microslice" that connects the UE 302 to the particular resource required to provide the service desired by the UE 302. In the simplistic illustration shown in FIG. 3, a first UE 302a communicates through a first microslice 305a. The microslice 305a is identified by a unique hash pattern through the route from the UE 302 to the application 314 (i.e., diagonal fill pattern). Similarly, a second microslice 305b used by a second UE 302b is identified by a cross hatch fill pattern. Likewise for the other two UEs 302c, 302d shown. The microslices allow a unique QoS and set of resources to be allocated to the service that the UE 302 is to receive from the enterprise network 300. It should be noted that while only one microslice is shown associated with each UE 302, one or more of the UEs 302 may establish links to different applications 314 using another unique microslice 305. Accordingly, each UE 302 can have more than one unique microslice operating at a time in order to access several services concurrently.

Each of the functions serves as a standalone functional block that can be implemented by computational nodes located at various locations throughout the network. The particular computational node that hosts a core function may reside anywhere, as long as communication can be established between the computational node and the other network functions to which the core function must communicate in order to perform its network function.

In conventional networks, the computational node that is to host each core function is assigned at the time the network is deployed. In contrast, the presently disclosed method and apparatus includes an orchestration module that dynamically manages the allocation of resources used to host each of the core functions, including the orchestration functionality itself.

In the network 300, the enterprise infrastructure 308 provides computation resources that can host enterprise core functionality (i.e., EPC and 5GC functionality).

Figure 5:
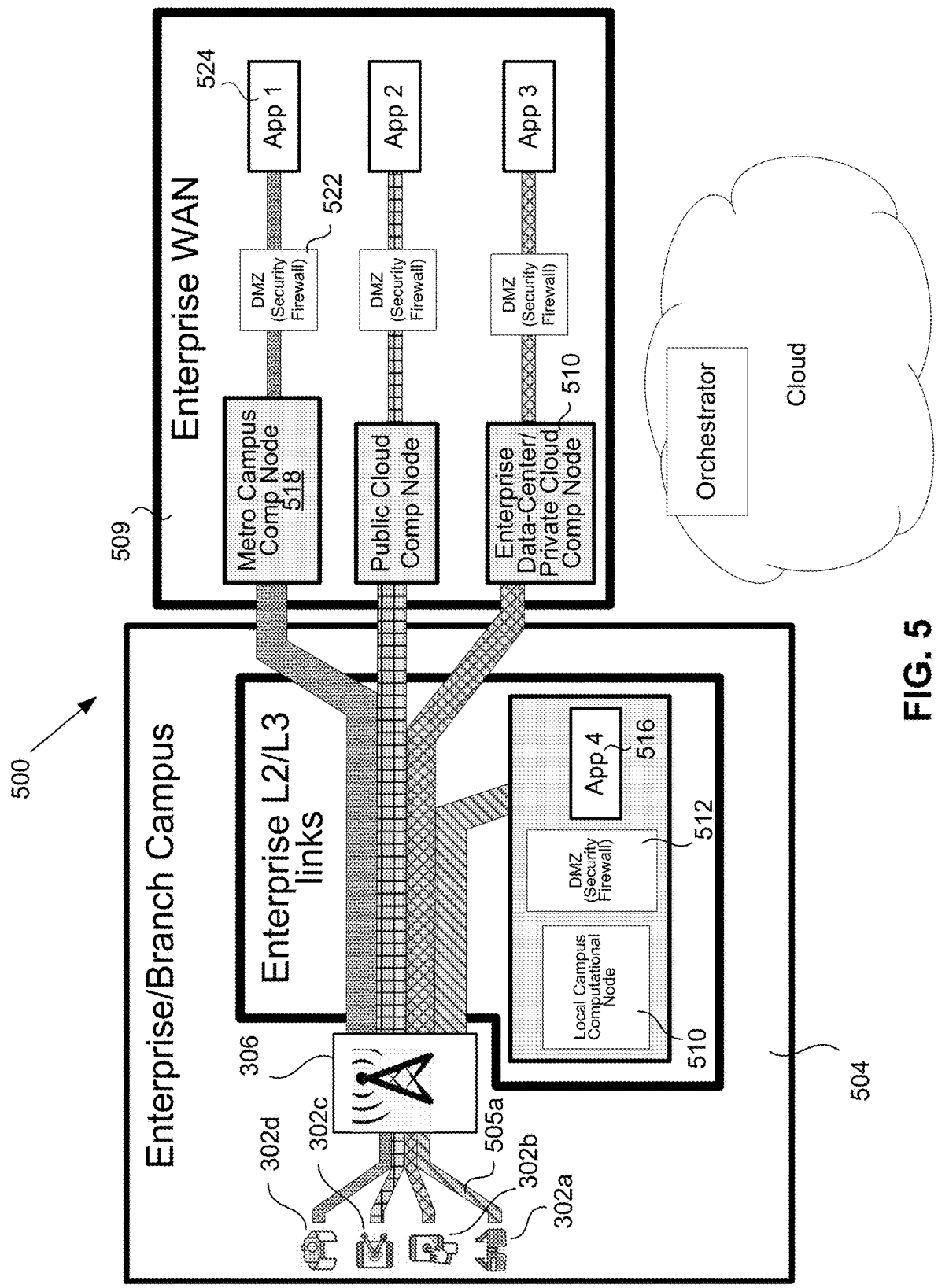
FIG. 5 is an illustration of the architecture of another enterprise network.

FIG. 5 is an illustration of the architecture of another enterprise network 500. In the network 500 computational nodes are available for hosting core functionality are located: (1) on-premises (i.e., within the location of at least one network campus of the enterprise network 500); (2) within a "metro campus" (i.e., a geographic region that is dispersed throughout a metropolitan area); (3) within a public cloud (i.e., servers that can be accessed, typically through the internet, and that can host one or more core functions; and/or (4) in an enterprise data center/private cloud.

VR goggles 302a located within an enterprise/branch campus 504 are connected by a microslice 505a through the BS/AP 306 to a local campus computational node 510 on-premises (i.e., geographically located within the enterprise campus). The local campus computational node 510 can be configured by an Orchestrator 503 to provide access through a secure firewall 512 to an on-premises VR application 516. Either alternatively, or in addition, the local campus computational node 510 can be configured by the Orchestrator 503 to host other enterprise core functions. The secure firewall 512 is provided to isolate the enterprise edge instance 510 from the VR application 516. In this case, even though the VR application 516 is located on-premises (i.e., on the campus 504 of the enterprise network), the VR application 516 is nonetheless provided by an untrusted source and so is not a trusted secure network component. The firewall 512 ensures that only communications that are authorized can occur between the VR application 516 and the metro campus computational node without jeopardizing the security of the enterprise network.

In the enterprise network 500, the metro campus computational node 518 is located off-premises, but within a geographically constrained area, such as within a metropolitan area. For example, an enterprise such as a chain of restaurants might have one enterprise local campus deployed at each restaurant. In addition, the enterprise might also have a metro campus that includes each of the local campuses of all of the restaurants within Detroit. Depending upon the network conditions, including the network load and the computational resources (i.e., the number and type of computational nodes) available and the location of a computational node that can host the VR application 516, the BS/AP 306 communicates with the metro campus computational node 518 over a WAN. The metro computational node 518 provides the required core functionality needed to allow a microslice to be established between the UE 302a and an application that can provide services to the UE 302a. A firewall 522 provides secure communication via the WAN between the metro campus computational node 518 and an untrusted computer vision application 524. The orchestrator 503 monitors network conditions, including the availability of computational resources, the amount of delay incurred for each potential allocation of a core function to a particular computational node and the SLA that governs the performance that that network is required to provide to the UE 302a. Based upon the conditions and resources being monitored by the orchestrator 503, the particular allocation of enterprise resources (e.g., computational nodes) is dynamically adjusted to maximize the efficiency and effectiveness of the network. For example, if a computational node that was previously unavailable is freed up to allow that computational node to be allocated to the UE 302a and if the newly freed up computational node has ready access to a VR application required by the UE 302a, then a determination is made as to whether that newly freed up computational node would be more appropriately suited to hosting the functionality needed to allow the UE 302a to access the associated VR application. Such evaluation and reallocation are done from time to time (or in some embodiments on a continuous basis) to ensure that the network operates at high efficiency.

Network dimensioning (i.e., the amount of physical and logical resources allocated to support the totality of the necessary functions required to provide a particular combination of services) is determined based on predictions regarding the number of active users to be serviced, the number of applications that users might use concurrently (i.e., the number of microslices and flows within each microslice), the amount of resources needed to support particular services for those users, and the need to prevent network congestion from rising above predetermined limits. Such parameters are typically reliant upon static definitions of the QoS (Quality of Service) required for each of the services supported. Ultimately, the determination must result in a network that can support the peak required capacity the network operates at high efficiency.

It is a difficult and complex task to dynamically adapt and alter the network operation to ensure the guarantees made regarding levels of service to be provided (i.e., ensuring that operation remains in accordance with SLAs under which the network has committed to operate). Attaining a clear understanding of the behavioral changes in the enterprise network can also add to the challenge of debugging network operations. Nonetheless, efficient and effective dynamic resource planning for an edgeless architecture has significant advantages.

Several aspects are considered when determining the required resources. Once the required resources have been determined, then, which computational nodes are to be allocated to support the required functions are determined. Functions may be grouped and associated with a particular computational node in order to ensure that inter-functional interactions can be performed more efficiently including the functionality required for orchestrating the dynamic allocations of resources. An effective determination of the functional grouping, allocation of computer nodes and management of orchestration enables the dynamic allocation, reallocation, splitting, and removal of the services. These aspects include: (1) deconstruction per application; (2) computational environments; (3) orchestration of edge instances; (4) application interfaces; and (5) security zoning.

Figure 6:
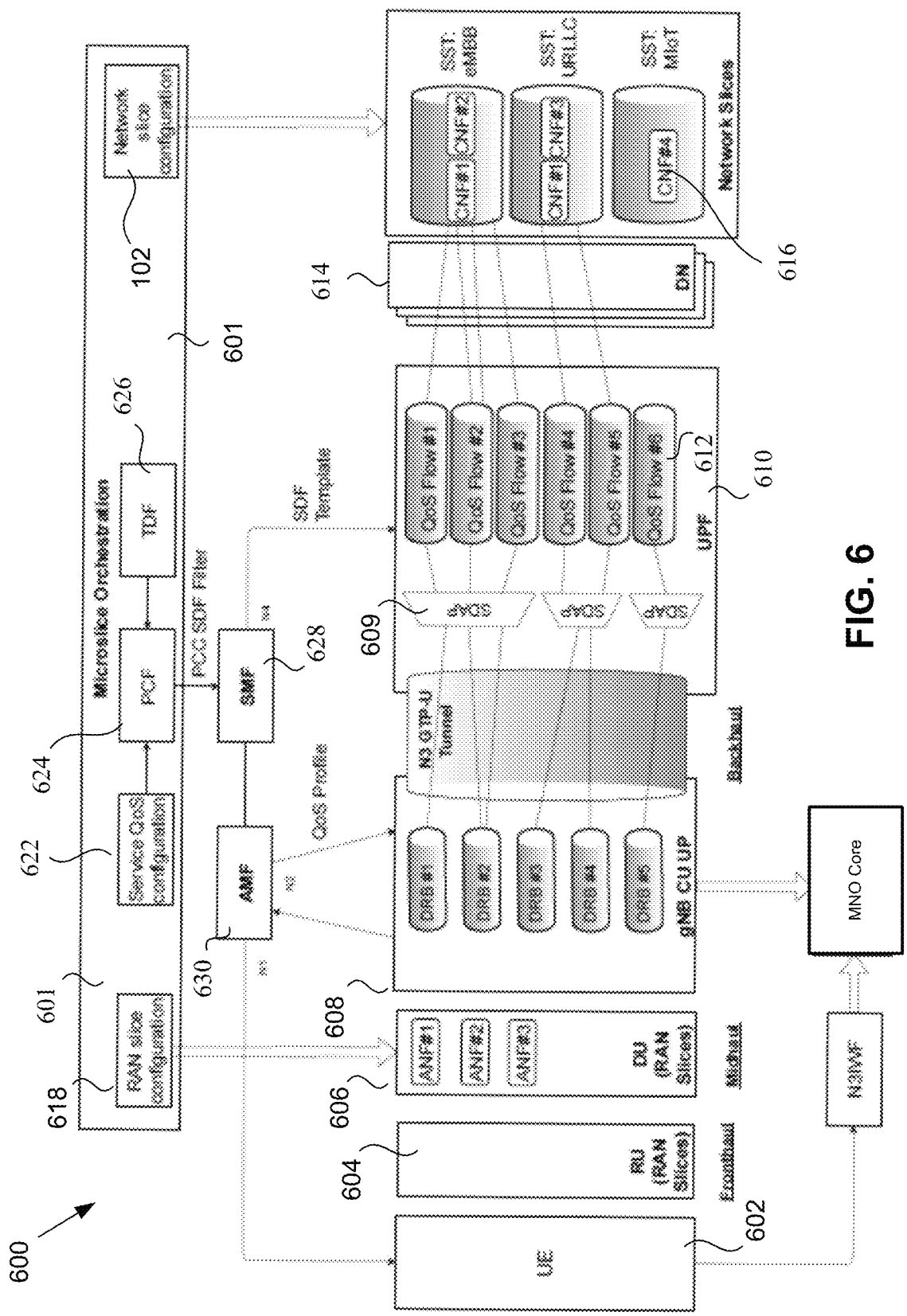
FIG. 6 illustrates the manner in which an orchestrator controls the allocation of computational node resources.

FIG. 6 illustrates the manner in which an orchestrator 601 controls the allocation of computational node resources. Each service provided to a UE 205 is associated with an independent allocation of network resources (i.e., computational nodes, communication links, etc.) along the signal path that are needed to provide the service to the user. In accordance with the presently disclosed method and apparatus, the RAN RU functionality typically should reside on-premises (i.e., within the enterprise campus in which the UE is located when attempting to access the enterprise network resources). However, RAN DU and RAN CU functionality may reside off-premises, i.e., within a metro campus, enterprise data center private cloud or a public cloud.

A UE 602 gains access to the network through the RAN RU 604. For each data flow through the network, the RAN RU 604 is associated with a RAN DU 606, a RAN CU-UP 608, an SDAP (Service Data Adaptation Protocol) module 609 within the UPF 610. The SDAP 609 is associated with a QoS flow 612. The QoS flow 612 is then routed through a DN 614. Lastly a microslice configuration (CNF) 616 is associated with the flow.

The orchestrator 601 determines the operational conditions of the network, including the loading imposed by all UEs 602 that are attempting to use the network resources. A RAN slice configuration module 618 manages the allocation of resources within the available RAN DU 606 throughout the network based on the delay requirements, the loading of the system etc. In addition, within an orchestrator 620, a QoS service configuration module 622, together with the PCF (Policy Control Function) 624 and TDF (Traffic Detection Function) 626 which monitor network conditions, communicate to the AMF 630 to control the allocation of computational nodes available throughout the network that can host the RAN CU-UP 608 for each data flow. Likewise, the Orchestrator 601 communicates with the SMF 628 to manage the allocation of computational nodes that can host the UPF 610. A network slice configuration module 632 within the orchestrator 601 establishes the slice configurations 616.

Deconstruction Per Application

As noted above, to deliver the SLA required for a given data flow (i.e., communication occurring between a UE and an application required to provide the user of the UE with services being requested), a certain set of functional blocks with the appropriate configuration need to be stitched together. The components (i.e., functional blocks and connections) that are used to provide the SLA required for a given application constitute a microslice for a data flow. This includes control and user plane functions in the orchestration function, core function and the functions of the RAN layers. In accordance with some embodiments of the disclosed method and apparatus, one or more required functions may be provided from computational resources located at multiple locations. This is true even for same deployment. In some embodiments, whether this is true may be based on the application being supported by a given service, with each application routed to a specific instance of the service based on its needs. A dynamic allocation or reallocation of different services is done based on realtime constraints and the operational costs involved.

Computational Nodes

Computational nodes running in different environments (e.g., at difference locations) can host various functions required to provide a requested service. In the context of this disclosure, a service is requested by a member of the enterprise network. An example of a service that can be provided to the user is access to a particular camera that is visually monitoring a location within the campus. There are several locations that have computational nodes that may be used to host functions required to perform a requested service. For example, a BS/AP, such as an integrated access point, can serve as a computational nodes that can host functionality requested by an enterprise UE. Similarly, a RAN DU within a gNB or a RAN CU in the gNB can be hosted by a computational node within the integrated access point. In addition, a PSE edge node located on premise, a server within a metro network, or public cloud can host a function and thus serve as a computational node to the enterprise network.

In the disclosed method and apparatus, specific services are run on the specific nodes based on a combination of: (1) the required SLAs for the user and application; (2) which compute resources available, and (3) the costs incurred for use of each of the particular nodes that are available to run the service.

Orchestration of Network Functions

In some embodiments, dynamic management of different functions and the appropriate allocations of computational nodes to host such functions are based on the realtime needs of the particular users and services to be orchestrated. Providing orchestration based on such factors ensures reliable outcomes from the orchestration procedures. In some embodiments, automated orchestration of network functions includes recognition of specific patterns of use and operation. For example, error rates, such as PER (packet error rate) and BER (bit error rate), as well as metrics that indicate the level of congestion are monitored.

By the monitored information, patterns are observed from which forecasts may be made. That is, based on past performance, predictions regarding future performance can be made. In some embodiments, an allocation of the required compute resources is made based on such predictions. In some embodiments, upon building a sufficient database of information, AI (artificial intelligence) engines can be used to assist in detecting such patterns and making such predictions. In some embodiments, the patterns are adjusted as needed based on periodic learning or relearning of the patterns.

In some embodiments, information in continuously monitored and stored in a database to allow the data to be used in the future for training AI engines. In an embodiment in which service node allocation is done automatically on a dynamic basis, a discovery mechanism to find the appropriate and relevant services needed for a given applications can be maintained. In some such embodiments, a "Pub-Sub" (publish/subscribe) model is used. In accordance with such a Pub-Sub model, resources are listed in a publication sent out to various nodes of the network to indicate what resources are available. Those nodes that receive such publications can then subscribe to the resource in order to qualify to allocate that resource. In some such embodiments, specific details about the services are specified in order to refine the discovery methodology.

In some embodiments with automatic methods for allocation of computational nodes, it is possible to manually override the automation when the user (i.e., the network administrator) desires to manually define how computational nodes are to be allocated. This can be done to manage specific applications based on the known characteristics. Allowing the automatic classification of applications, the discovery of characteristics and parameters of the applications and computational nodes during run time, makes it easier to ensure that the QoS required by SLAs is provided in as many instances as possible. With the QoS requirements determine, automatic association with the required set of services is determine including locating the services in the appropriate locations with the associated configuration.

Orchestration of the services on the different computational nodes is performed with specific network functions being host at various locations and associated with various supported applications. Factors that are considered in the process of performing such orchestration include deciding on the desired location and computational node to be allocated to perform the application functions needed to provide each service that has been requested (where the particular service application will be hosted), deciding on which location and computational nodes are desired for hosting each network function required to access the requested service application. A data flow associated with a particular computational nodes triggers the orchestration of the computational node. In addition, the SLA associated with the particular application is monitored, as well as related computational nodes that are available for hosting the particular application. In addition, the services are dynamically readjusted to accommodate the realtime needs of the individual users/applications.

In addition, the orchestration procedure is based on the compute and network resources that are available. The procedure is adjusted automatically to account for any changes in the availability of such resources (i.e., links and/or computational nodes). In addition, the orchestration procedure is based on the required application performance and the SLA which determines the level of service that the enterprise agreed to provide. The orchestration procedure automatically takes these factors into account.

Because the services are located in the nodes distributed through the network, control and data plane separation in the user(s)/application(s) is also taken into account by the orchestration procedure. The services and the IP connectivity aspects are addressed by creating a network overlay as a programmable software defined network, which involves integration with network slices and VLANs/VxLANs and integration with SDWANs.

Application Interfaces

As part of the Pub/Sub model that is used in some embodiments of the disclosed method and apparatus, services are published, which indicate specific supported functions and provide information regarding the type of users and applications that can use each such service. In some embodiments, the configuration that is appropriate for the individual user and/or application is specified when associating the user and/or application to be used with a specific instance of a given service. In some embodiments, every aspect (i.e., component, node, functional module, etc.) of the network is treated as an edge instance, each with its own set of supported services.

The dynamic association of the users/applications to the edge instances/services allows for the network components to be treated as NaaS (network as a service)

The APIs allow for the management of the microslice regulating the SLAs provided and also allow for the relevant metrics to be collected to ensure that the agree upon SLAs are delivered.

Security Zoning

In some embodiments, based on the needs of particular users and the applications requested by them, it may be necessary to provide isolation for particular edge instances that are allocated to support particular applications, along with the supported set of services associated with the particular edge instances. In such embodiments, connectivity procedures are implemented for the users, applications, and the interconnections between edge instances providing requested services. In some embodiments, this is done by establishing zero trust zones and regulating the required connectivity paths across the different entities including the user, application, edge instances, and services. In some embodiments, such zero trust zones are established by providing the edge instances, and in some embodiments, the individual services to be protected, with explicit credentials. This prevents corruption of the functional and data operation.

Cloud Breathing

Cloud breathing is the process of having resources dynamically moved between on premises equipment and cloud-based servers and compute instances. Moving the service to public cloud from an on-premises compute instance is termed "breathing in". Moving microservices from the public cloud to an on-premise compute instance is termed "breathing out". Cloud bursting is a term that refers to the private cloud "bursting" into the public cloud to access additional computing resources with minimal or no service interruption. In some embodiments, cloud bursts can be triggered automatically in response to high demand usage for resources that are in short supply in the on-premises compute instances. Alternatively, cloud bursting can occur in response to a request for such manual cloud bursting from a user or network administrator.

In some embodiments, several factors assist in determining transitions across the different compute instances within and outside the network. These factors include:

1) Whether a UE has been handed over from one BS/AP to another, moved from one network site to another or moved from one enterprise to another;
2) Which compute instance is currently hosting an application being accessed by a UE;
3) The BS/AP available in the location in which the UE is operational;
4) Any limitations that exist one the operational capabilities of the various on-premises compute instances available;
5) Cost considerations, including the cost of accessing particular compute instances that reside off premises; and
6) SLAs that dictate the operational requirements for each application at issue.

Changes in the allocations of resources can also prioritized in a manner that allocates resources (i.e., compute instances, servers, nodes, etc.) required to provide the requested services that are located closest to the BS/AP through which the UE requesting the service is accessing the network. Accordingly, resources that are further away are allocated only when there are constraints that make it undesirable to allocate the closer resource. In some embodiments, this allocation/reallocation is done at regular intervals, and in some embodiment, essentially continuously.

In some embodiments, different levels of SLA (i.e., different operational commitments for QoS, etc.) can be selected based on a need to relax SLAs associated with one or more of the services in order to ensure that all of the network commitments can be maintained. In some embodiments, this might include switching from local on-premises compute to a compute instance within a public cloud and providing a subdued SLA (i.e., reducing the network commitments for the particular service at issue). In some embodiments, such a reduction in the commitments of the network may be reversed when capacity constraints are relieved.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of defining a microslice by a network administrator of an enterprise network, to efficiently arrange data flows in the enterprise network and provide an end-to-end Quality of Service (QoS) between wireless user equipment (UE) in the enterprise network and an external server, comprising the steps of:
   defining a QoS, including defining QoS parameters; and
   creating and defining a micro slice for a dataflow, the creating and defining of the microslice including
   assigning, by the network administrator, the QoS parameters to the microslice;
   responsive to said QoS parameters, providing Service Level Objectives for the microslice; the microsplice being components that provide the SLA required for data flow for a given application, the components include a control function and a user plane function in an orchestration function, core function and functions of Radio Access Network (RAN) layers;
   assigning at least one bearer to the microslice, the at least one bearer meeting the QoS and SLOs of the microslice, to provide an end-to-end logical network between the UE and the external server, said end-to-end logical network connecting the UE and external server through at least a RAN and a Core Network; and
   determining functional groupings associated with the microslices based on a deconstruction performed on a per application basis, the deconstruction including providing a Service Level Agreement (SLA) required for a given application via functional blocks and connections that constitute the microslice.

2. The method of claim 1, running computational nodes in different environments, the computational nodes hosting functions required to provide a requested service, the service being requested by a member of the enterprise network.

3. The method of claim 1, further comprising
   monitoring a location within a campus and
   determining locations that have computational nodes that are capable of hosting functions required to perform a requested service.

4. The method of claim 3, the computations including an access point access point serving as a computational node hosting functionality requested by an enterprise UE.

5. The method of claim 3, the computational nodes hosting a RAN DU within an access point.

6. The method of claim 3, the computational nodes hosting a RAN CU on the access point.

7. The method of claim 3, the computational nodes including a Power Sourcing Equipment (PSE) edge node located on a premise of an enterprise.

8. The method of claim 3,
   dynamically managing different functions and
   allocating computational nodes to host functions based on realtime needs of particular users and services to be orchestrated.

9. The method of claim 3, further comprising an automated orchestration of network functions including recognition of specific patterns of use and operation.

10. The method of claim 3, further comprising an automated orchestration of network functions, which includes monitoring error rates.

11. The method of claim 3, further comprising an automated orchestration of network functions including BER (bit error rate).

12. The method of claim 1, further comprising providing isolation for particular edge instances that are allocated to support particular applications, along with a supported set of services associated with particular edge instances, wherein connectivity of procedures are implemented for users, applications, and interconnections between edge instances providing requested services, by establishing zero trust zones and regulating required connectivity paths across different entities including the user, application, edge instances, and services.

* * * * *